(12) United States Patent
Marshall et al.

(10) Patent No.: US 10,754,966 B2
(45) Date of Patent: Aug. 25, 2020

(54) TIME-BASED FUNCTIONALITY RESTRICTIONS

(71) Applicant: AIRWATCH LLC, Atlanta, GA (US)

(72) Inventors: John Marshall, Atlanta, GA (US); Erich Stuntebeck, Marietta, GA (US)

(73) Assignee: AIRWATCH LLC, Atlanta, GA (US)

( * ) Notice: Subject to any disclaimer, the term of this patent is extended or adjusted under 35 U.S.C. 154(b) by 71 days.

(21) Appl. No.: 13/862,380

(22) Filed: Apr. 13, 2013

(65) Prior Publication Data

US 2014/0310771 A1    Oct. 16, 2014

(51) Int. Cl.
*G06F 21/62*    (2013.01)
*H04L 29/06*    (2006.01)

(52) U.S. Cl.
CPC ........ *G06F 21/6218* (2013.01); *H04L 63/102* (2013.01); *H04L 63/108* (2013.01); *G06F 2221/2137* (2013.01); *H04L 63/20* (2013.01)

(58) Field of Classification Search
CPC ......... H04L 63/20; H04L 63/08; H04L 63/10; H04L 63/102; G06F 21/6218; G06F 21/62; G06F 21/60
See application file for complete search history.

(56) References Cited

U.S. PATENT DOCUMENTS

| | | | |
|---|---|---|---|
| 5,574,786 A | | 11/1996 | Dayan et al. |
| 5,740,395 A | * | 4/1998 | Wells et al. ................... 711/103 |
| 5,987,609 A | | 11/1999 | Hasebe |
| 6,021,492 A | | 2/2000 | May |
| 6,023,708 A | | 2/2000 | Mendez et al. |
| 6,085,192 A | | 7/2000 | Mendez et al. |
| 6,131,096 A | | 10/2000 | Ng et al. |
| 6,131,116 A | | 10/2000 | Riggins et al. |
| 6,151,606 A | | 11/2000 | Mendez |
| 6,233,341 B1 | | 5/2001 | Riggins |
| 6,560,772 B1 | | 5/2003 | Slinger |
| 6,708,221 B1 | | 3/2004 | Mendez et al. |
| 6,714,859 B2 | | 3/2004 | Jones |
| 6,726,106 B1 | | 4/2004 | Han et al. |
| 6,727,856 B1 | | 4/2004 | Hill |
| 6,741,232 B1 | | 5/2004 | Siedlikowski et al. |
| 6,741,927 B2 | | 5/2004 | Jones |
| 6,766,454 B1 | | 7/2004 | Riggins |

(Continued)

FOREIGN PATENT DOCUMENTS

| | | |
|---|---|---|
| CA | 2149337 A1 | 6/1994 |
| GB | 2346716 A | 8/2000 |
| WO | 0241661 A2 | 5/2002 |

OTHER PUBLICATIONS

Asynchrony Software, Inc. "PDA Defense User Guide", 726, 2002.

(Continued)

*Primary Examiner* — Fatoumata Traore
(74) *Attorney, Agent, or Firm* — Thomas Horstemeyer, LLP (57) ABSTRACT

Time-based functionality restrictions may be provided. Periodic scans may be performed to identify requests to perform functions on user devices, to determine whether the functions are compliant with compliance rules associated with the user devices that specify time periods during which the user devices are authorized to perform the functions, and to perform remedial actions if the functions are not compliant with the compliance rules.

20 Claims, 3 Drawing Sheets

(56) References Cited

U.S. PATENT DOCUMENTS

| | | | |
|---|---|---|---|
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,107,339 B1* | 9/2006 | Wolters | 709/224 |
| 7,184,801 B2 | 2/2007 | Farcasiu | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,496,957 B2 | 2/2009 | Howard et al. | |
| 7,539,665 B2 | 5/2009 | Mendez | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton, III et al. | |
| 7,735,112 B2 | 6/2010 | Kim et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,117,344 B2 | 2/2012 | Mendez et al. | |
| 8,150,431 B2 | 4/2012 | Wolovitz et al. | |
| 8,225,381 B2 | 7/2012 | Lemke | |
| 8,332,350 B2* | 12/2012 | Pulfer et al. | 707/608 |
| 8,713,173 B2* | 4/2014 | Kacherov | H04L 63/20 709/224 |
| 8,756,390 B2* | 6/2014 | Chu et al. | 711/163 |
| 9,307,451 B1* | 4/2016 | Kodeswaran | H04W 12/08 |
| 2002/0013721 A1 | 1/2002 | Dabbiere et al. | |
| 2003/0110084 A1 | 6/2003 | Eberhard et al. | |
| 2003/0204716 A1 | 10/2003 | Rockwood et al. | |
| 2004/0123153 A1 | 6/2004 | Wright et al. | |
| 2004/0181687 A1 | 9/2004 | Nachenberg et al. | |
| 2004/0224703 A1 | 11/2004 | Takaki et al. | |
| 2005/0246192 A1 | 11/2005 | Jauffred et al. | |
| 2006/0190984 A1 | 8/2006 | Heard et al. | |
| 2007/0033397 A1 | 2/2007 | Phillips, II et al. | |
| 2007/0136492 A1 | 6/2007 | Blum et al. | |
| 2007/0156897 A1 | 7/2007 | Lim | |
| 2007/0174433 A1 | 7/2007 | Mendez et al. | |
| 2007/0261099 A1 | 11/2007 | Broussard et al. | |
| 2007/0266422 A1* | 11/2007 | Germano | H04L 63/0263 726/1 |
| 2007/0288637 A1 | 12/2007 | Layton et al. | |
| 2008/0133712 A1 | 6/2008 | Friedman et al. | |
| 2008/0134176 A1 | 6/2008 | Fitzgerald et al. | |
| 2008/0134305 A1 | 6/2008 | Hinton et al. | |
| 2008/0134347 A1 | 6/2008 | Goyal et al. | |
| 2008/0201453 A1 | 8/2008 | Assenmacher | |
| 2008/0228504 A1* | 9/2008 | Nguyen et al. | 705/1 |
| 2009/0036111 A1 | 2/2009 | Danford et al. | |
| 2009/0077621 A1 | 3/2009 | Lang et al. | |
| 2009/0144632 A1 | 6/2009 | Mendez | |
| 2009/0198997 A1 | 8/2009 | Yeap et al. | |
| 2009/0260064 A1 | 10/2009 | McDowell et al. | |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005195 A1 | 1/2010 | Mendez et al. | |
| 2010/0023630 A1 | 1/2010 | Mendez et al. | |
| 2010/0100641 A1 | 4/2010 | Quinlan et al. | |
| 2010/0120450 A1 | 5/2010 | Herz | |
| 2010/0138371 A1* | 6/2010 | Ishii | 706/12 |
| 2010/0144323 A1 | 6/2010 | Collins et al. | |
| 2010/0146269 A1 | 6/2010 | Baskaran | |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299719 A1 | 11/2010 | Burks et al. | |
| 2011/0004941 A1 | 1/2011 | Mendez et al. | |
| 2011/0082900 A1 | 4/2011 | Nagpal et al. | |
| 2011/0113062 A1 | 5/2011 | Quinlan et al. | |
| 2011/0145932 A1 | 6/2011 | Nerger et al. | |
| 2011/0153779 A1 | 6/2011 | Mendez et al. | |
| 2011/0153799 A1 | 6/2011 | Ito | |
| 2011/0167474 A1 | 7/2011 | Sinha et al. | |
| 2011/0202589 A1 | 8/2011 | Piernot et al. | |
| 2011/0225252 A1 | 9/2011 | Bhat et al. | |
| 2011/0270799 A1 | 11/2011 | Muratov | |
| 2011/0276805 A1 | 11/2011 | Nagpal et al. | |
| 2011/0296186 A1 | 12/2011 | Wong et al. | |
| 2011/0320552 A1 | 12/2011 | Friedman et al. | |
| 2012/0005075 A1 | 1/2012 | Hawkins | |
| 2012/0015644 A1 | 1/2012 | Danford et al. | |
| 2012/0032945 A1* | 2/2012 | Dare | G06F 3/0481 345/418 |
| 2012/0102392 A1 | 4/2012 | Reesman et al. | |
| 2012/0198547 A1 | 8/2012 | Fredette et al. | |
| 2012/0302204 A1* | 11/2012 | Gupta | H04M 15/44 455/406 |
| 2013/0061307 A1 | 3/2013 | Livne | |
| 2013/0152169 A1 | 6/2013 | Stuntebeck | |
| 2014/0007182 A1* | 1/2014 | Qureshi | G06F 21/10 726/1 |

OTHER PUBLICATIONS

Belani, Eshwar et al., "The CRISIS Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

(56) References Cited

OTHER PUBLICATIONS

Menaria, Pankaj et al., "Security in Mobile Database Systems", 707, 726, Mar. 17, 2011.
Pfitzmann, Andreas et al., "Mobile User Devices and Security Modules: Design for Trustworthiness", 726, Feb. 5, 1996.
Steiner, Jennifer , "Kerberos: An Authentication Service for Open Network Systems", 726, Jan. 12, 1988.
Strunk, John et al., "Self-Securing Storage: Protecting Data in Compromised Systems", Symposium on Operating Systems Design and Implementation, 726, 2000.
International Searching Authority, "ISR and Written Opinion of the ISA in PCT/US2013/065915".
International Search Report dated Jul. 7, 2016, for Application No. PCT/2013065915.
Patent Examination Report dated Aug. 11, 2016, for Application No. 2013385810.
Examination Report dated Feb. 27, 2018 for Application No. 13 881 779.6-1222.
Conti M et al: "CRePE: A System for Enforcing Fine-Grained Context-Related Policies on Android", IEEE Transactions on Information Forensics and Security, IEEE, Piscataway, NJ, US, vol. 7, No. 5, Oct. 1, (Oct. 1, 2012), pp. 1426-1438.
Summons to Attned Oral Proceedings mailed for European Application No. 13881779.6-1222 / 2965206.

\* cited by examiner

TIME-BASED FUNCTIONALITY RESTRICTIONS

BACKGROUND

Today, many governments are implementing legislative penalties for businesses that provide their employees with access to business resources and/or device functionality outside of standard workday hours. Also, many businesses experience loss of revenue as a result of their employees' access to personal resources and/or device functionality during standard workday hours. Automated compliance rules may be provided for handling situations where certain functionality on a device is restricted during certain time periods, such as during and/or outside standard workday hours. Conventional solutions often restrict the use of a device entirely to prevent the device from performing such functionality that is restricted during such time periods.

SUMMARY

This Summary is provided to introduce a selection of concepts in a simplified form that are further described below in the Detailed Description. This Summary is not intended to identify key features or essential features of the claimed subject matter. Furthermore, this Summary is not intended to limit the claimed subject matter's scope.

Time-based functionality restrictions may be provided. Periodic scans may be performed to identify requested functionality and determine whether the functionality is restricted according to a time constraint. Upon identifying a request to perform functionality that is restricted according to a time constraint, the request to perform the functionality may be denied. The time constraints may be defined according to, amongst other possible time periods, standard workday hours.

It is to be understood that both the foregoing general description and the following Detailed Description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the Detailed Description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

The following Detailed Description refers to the accompanying Figures. Wherever possible, the same reference numbers are used in the Figures and the following description to refer to the same or similar elements. While embodiments of the disclosure may be described, modifications, adaptations, and other implementations are possible. For example, substitutions, additions, or modifications may be made to the elements illustrated in the Figures, and the methods described herein may be modified by substituting, reordering, or adding stages to the disclosed methods. Accordingly, the following Detailed Description does not limit the disclosure. Instead, the proper scope of the disclosure is defined by the appended claims.

Time-based functionality restrictions may be provided by certain methods, apparatuses, and non-transitory computer readable medium as described herein. Methods for providing time-based functionality restrictions may include methods performed by software applications. Examples of such methods may include those performed by device management server applications executed on servers and device management agent applications executed on user devices. User devices may include smartphones, tablets, laptops, desktops and other computing devices. Moreover, apparatuses for providing time-based functionality restrictions may include devices executing software applications that perform methods for providing time-based functionality restrictions. Examples of such apparatuses may include servers executing device management server applications and user devices executing device management agent applications. Additionally, non-transitory computer readable mediums for providing time-based functionality restrictions may include software applications that when executed cause a computing device to perform the steps of the methods for providing time-based functionality restrictions. Examples of such non-transitory computer readable mediums may include device management server applications executable by servers and device management agent applications executable by user devices.

Providing time-based functionality restrictions may begin by identifying requests to perform functions on user devices and/or identifying functions being performed on user devices. Compliance rules associated with the user devices may be identified and, based on such compliance rules, a determination may be made as to whether the functions requests and/or being performed are authorized to be performed by the user devices at the current time. If it is determined that the user devices are not authorized to perform the functions at the current time, a remedial action may be performed such as blocking the function being requested and/or being performed. If it is determined a second time that the users are not authorized to perform the functions at the current time, an escalated remedial action may be taken such as erasing business and/or personal data from the user device. Furthermore, if it is determined that the user devices are authorized to perform the functions at the current time, the user devices may be permitted to proceed with the request to perform functions and/or the functions being performed without interruption.

Time-based functionality restrictions may be implemented to enable and/or disable certain functionality on a user device during and/or outside of standard workday hours. For example, time-based functionality restrictions may ensure that employees only receive their business email on their smartphone during workdays and only receive their personal email on their smartphone outside workdays.

Figure 1:
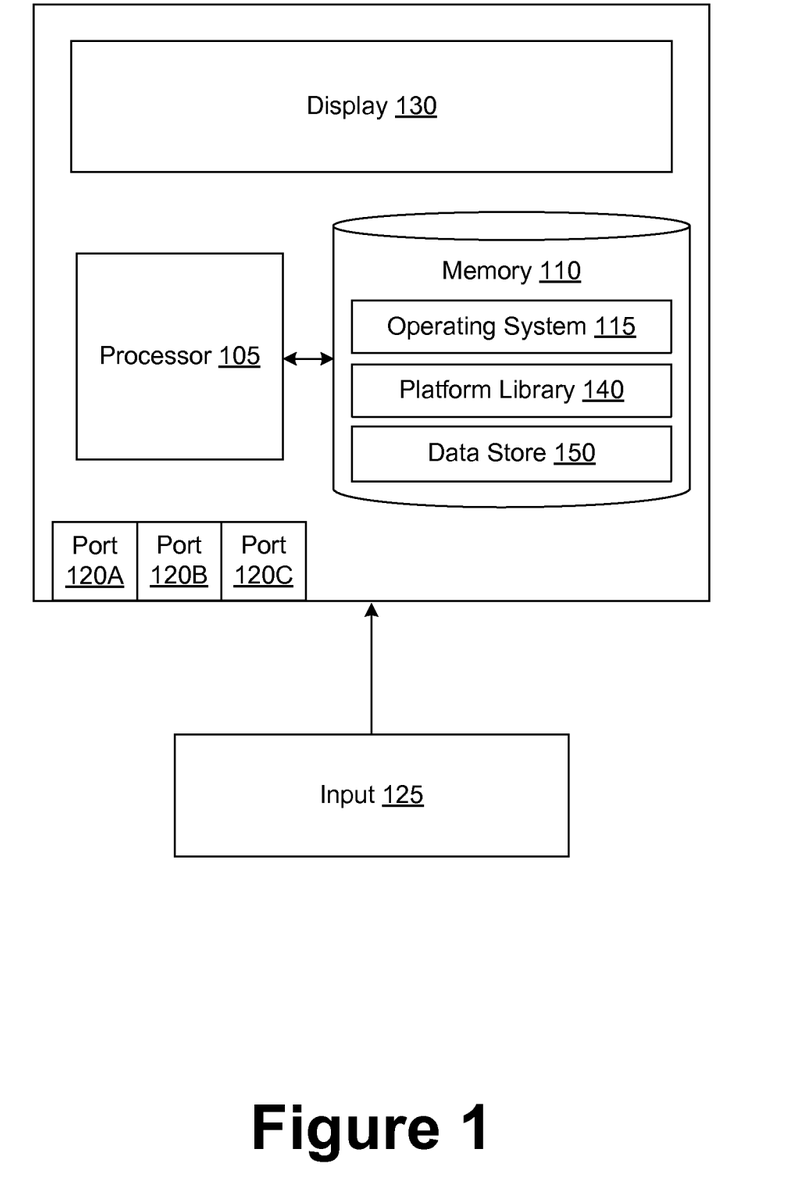
FIG. 1 is a block diagram of a user device.

FIG. 1 is a block diagram of a User Device 100 comprising a Processor 105 and a Memory 110. Depending on the configuration and type of User Device, Memory 110 may comprise, but is not limited to, volatile (e.g. random access memory (RAM)), non-volatile (e.g. read-only memory (ROM)), flash memory, or any combination thereof.

Memory 110 may store executable programs and related data components of various applications and modules for execution by User Device 100. Memory 110 may be coupled to Processor 105 for storing configuration data and operational parameters, such as commands that are recognized by Processor 105. User Device 100 may comprise, for example, a desktop computer, a laptop computer, a personal digital assistant, a cellular telephone, a set-top box, a music player, a web pad, a tablet computer system, a game console, and/or another device with like capability.

Basic functionality of User Device 100 may be provided by an Operating System 115 contained in Memory 100. Various programmed software applications may be executed by utilizing the computing resources in User Device 100. Applications stored in Memory 110 may be executed by Processor 105 (e.g., a central processing unit or digital signal processor) under the auspices of Operating System 115. For example, Processor 105 may be configured to execute applications such as web browsing applications, email applications, instant messaging applications, and/or other applications capable of receiving and/or providing data.

Data provided as input to and generated as output from the application(s) may be stored in Memory 110 and read by Processor 105 from Memory 110 as needed during the course of application program execution. Input data may be data stored in Memory 110 by a secondary application or other source, either internal or external to User Device 100, or possibly anticipated by the application and thus created with the application program at the time it was generated as a software application program. Data may be received via any of a plurality of (Communication) Ports 120A, 120B, and/or 120C of User Device 100. Communication Ports 120A, 120B, and/or 120C may allow User Device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User Device 100 may also receive data as user input via an Input (Component) 125, such as a keyboard, a mouse, a pen, a stylus, a sound input device, a touch input device, a capture device, etc. A capture device may be operative to record user(s) and capture spoken words, motions and/or gestures, such as with a camera, microphone, and/or accelerometer. The capture device may comprise any speech and/or motion detection device capable of detecting the speech and/or actions of the user(s).

Data generated by applications may be stored in Memory 110 by the Processor 105 during the course of application program execution. Data may be provided to the user of User Device 100 during application program execution by means of a Display 130. Consistent with embodiments of this disclosure, Display 130 may comprise an integrated display screen and/or an output port coupled to an external display screen.

Memory 110 may also comprise a Platform Library 140. Platform Library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, User Device 100 may also include additional data storage devices (removable and/or non-removable) such as, for example, magnetic disks, optical disks, or tape (not shown).

User Device 100 may store device and/or user-specific information in a Data Store 150, such as a device profile, a plurality of credentials and/or a plurality of user preferences. A device profile may comprise an indication of the current position of User Device 100 and/or indications of the hardware, software, and security attributes that describe User Device 100. For instance, the device profile may represent hardware specifications of User Device 100, version and configuration information of various software program and hardware components installed on User Device 100, data transmission protocols enabled on User Device 100, version and usage information of various resources stored on User Device 100, and/or any other attributes associated with the state of User Device 100. The device profile may further comprise data indicating a date of last virus scan of User Device 100, a date of last access by an IT representative, a date of last service by the IT representative, and/or any other data indicating maintenance and usage of User Device 100. Furthermore, the device profile may comprise indications of the past behavior of associated users, such as resources accessed, charges for resources accessed, and the inventory accessed from such resources.

The credentials may comprise a plurality of user credentials and/or a plurality of device credentials. The user credentials may comprise a plurality of PIN numbers, simple passwords, complex passwords, usernames, account identifiers, biometric indicators, and/or other data capable of authenticating the user of the User Device 100. The device credentials may comprise a plurality of hardware identifiers, serial numbers, IMEI numbers, phone numbers, and/or other data capable of authenticating the User Device 100. The user preferences may comprise a listing of factors that may affect the experience of the user of User Device 100. In particular, the user preferences may include indications of the user's age, gender, bodily traits, preferred resource types, preferred venue resources, and combinations thereof.

Figure 2:
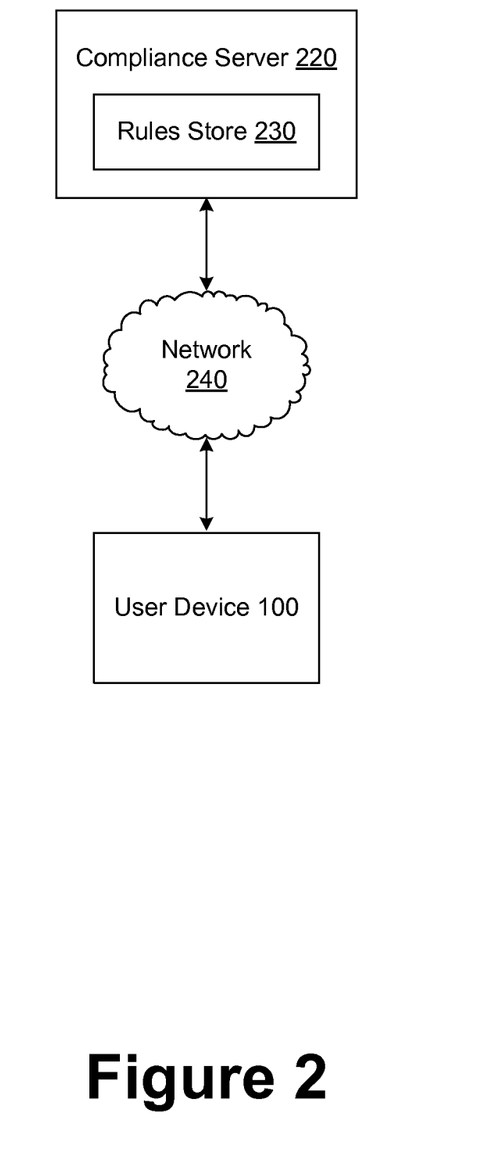
FIG. 2 is a block diagram of an operating environment.

FIG. 2 is a block diagram view of an operating environment 200 comprising User Device 100 in communication with a Compliance Server 220 via a Network 240. The Compliance Server 220 may comprise, for example, cloud-based solutions, server computers and/or any other system providing device management capability. For purposes of convenience, the Compliance Server 220 is referred to herein in the singular, although it is understood that a plurality of servers may be employed in the arrangements as descried herein. Furthermore, in some embodiments, multiple Compliance Servers 220 may operate on the same server computer. The components executed on the Compliance Server 220, for example, may comprise various applications, services, processes, systems, engines, or functionality not disclosed in detail herein.

The Compliance Server 220 may comprise a Rules Store 230 comprising a plurality of compliance rules that may be applicable to User Device 100. While the Rules Store 230 is shown as within the Compliance Server 220, the Rules Store 230 may alternately be within the User Device 100 and may be remotely updated periodically by Compliance Server 220 according to common over-the-air (OTA) updating methods. Attempts by User Device 100 to perform certain functionality on User Device 100 may require User Device 100 to be in compliance with one and/or more of the compliance rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, User Device 100 and/or Compliance Server 220 may be operative to determine whether the user of User Device 100 is authorized to perform requested functionality at the time the user requests to perform such functionality.

In some embodiments, an agent application executed on User Device 100 may make the compliance determination based on the device profile, credentials, and/or user preferences. For instance, an agent application may monitor the calls by applications on User Device 110 to the Operating System 115 of User Device 100 to determine whether User Device 110 seeks to perform functionality that may violate a given compliance rule. Additionally, an agent application on User Device 100 may approve and/or deny the associated functionality requests. For instance, the agent application may instruct Operating System 115 on User Device 100 to disable the camera of User Device 120 in response to a determination that a compliance rule specifies that the camera cannot be used at the time of the request by the User Device 100 to operate the camera.

In some embodiments, an agent application executed on User Device 100 may rely on Compliance Server 220 to determine whether a given functionality request on User Device 100 is permitted according to the compliance rules. For instance, the agent application may transmit a functionality request, a device profile, credentials, and/or user preferences to Compliance Server 220 so that Compliance Server 220 may determine whether User Device 110 seeks to perform functionality that may violate a given compliance rule. Additionally, Compliance Server 220 may approve and/or deny the associated functionality requests. For instance, Compliance Server 220 may instruct an agent application on User Device 100 to instruct Operating System 115 on User Device 100 to disable the email transmission port of User Device 120 in response to a determination that a compliance rule specifies that email cannot be received at the time of the request by the User Device 100 to receive email. Compliance Server 220 may, for instance, instruct an agent application and/or Operating System 115 of User Device 100 via application programming interface (API) calls and/or other programming that allows control and/or instruction of User Device 100 by applications and/or services communicatively coupled to User Device 100.

In some embodiments, the compliance rules may comprise device settings and/or executable instructions that define which functionality the Operating System 115 of User Device 100 is authorized to perform at a given time. In certain embodiments, the compliance rules may specify that functionality related to personal use of User Device 100 may not be performed during standard workday hours, and/or that functionality related to business use of User Device 100 may not be performed outside standard workday hours. For example, the compliance rules may specify that business applications may only be executed on User Device 100 between 9 AM and 5 PM on weekdays, and may specify that personal applications may only be executed on User Device 100 between 5 PM and 9 AM on weekdays and/or anytime on weekends. Furthermore, the compliance rules may comprise a list of functions, such as those provided by APIs associated with Operating System 115 and/or Platform Library 140, that may be treated as protected functions. Calls to these functions, such as calls to retrieve login credentials, may result in checks by User Device 100 and/or Compliance Server 220 for compliance with the compliance rules.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

Figure 3:
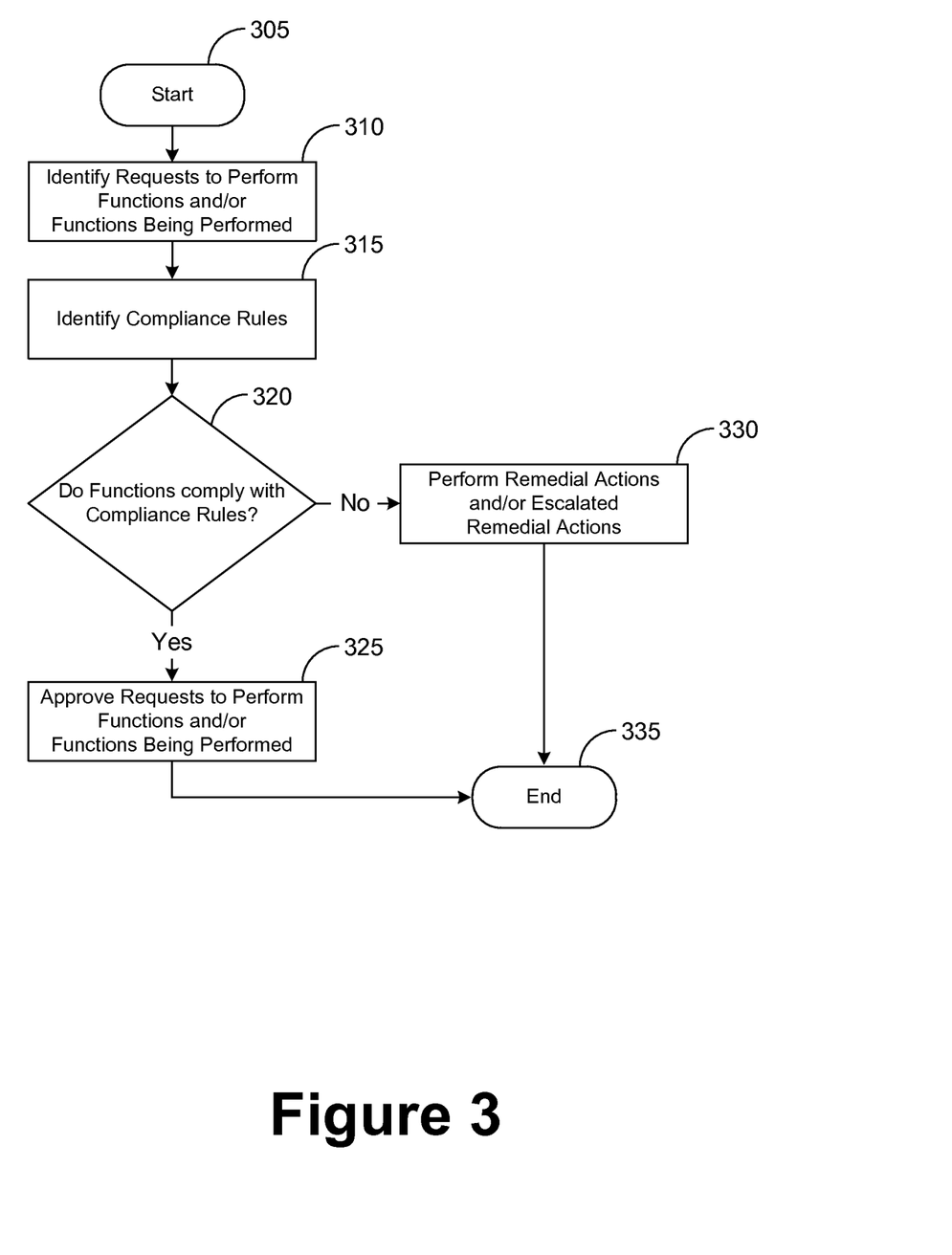
FIG. 3 is a flow chart illustrating a method for providing time-based functionality restrictions.

FIG. 3 is a flow chart setting forth the general stages involved in a method 300 consistent with embodiments of this disclosure for providing time-based functionality restrictions. Ways to implement the stages of method 300 will be described in greater detail below. For purposes of illustration, not limitation, method 300 is described with respect to User Device 100 in communication with Compliance Server 220. Method 300 may begin at starting block 305 and proceed to stage 310 and identify requests to perform functions on a User Device 100 and/or functions being performed on a User Device 100. For example, a request to access business email on a User Device 100 may be identified in stage 310.

From stage 310, method 300 may advance to stage 315 where method 300 identifies a plurality of compliance rules associated with the User Device 100. In some embodiments, the compliance rules may specify at least one time period when the User Device 100 is authorized to perform a given function. Examples of compliance rules include compliance rules that specify that business functions may only be accessed during business hours and compliance rules that specify that personal functions may only be accessed during personal hours. From stage 315, method 300 may advance to stage 320 where method 300 determines whether the functions associated with the User Device 100 comply with the compliance rule associated with the User Device 100. For instance, a request to access a business email account on User Device 100 outside of workday hours would not comply with a compliance rule specifying that User Device 100 is only authorized to access business email accounts during workday hours.

If it is determined that the functions do not comply with the compliance rules, method 300 may advance to stage 330 and perform a remedial action. Remedial actions may be taken on a User Device 100 and/or remote services communicatively coupled to a User Device 100. Remedial actions may include disabling hardware features of a User Device 100, disabling software features of a User Device 100, disabling applications of a User Device 100, erasing the contents of memory locations of a User Device 100, restoring a User Device 100 to its factory state, and queuing a function until a User Device 100 is authorized to perform the function. Disabling hardware features of a User Device 100 may include disabling the Camera, Microphone and/or other features of a User Device 100 that are available on User Device 100. Disabling software features of a User Device 100 may include disabling Siri and/or other software features provided by Operating System 115 and/or other factory-installed software of User Device 100. Disabling applications of a User Device 100 may include uninstalling and/or blocking execution of applications of a User Device 100, such as email applications, browser applications, content management applications, application stores and/or the like.

Erasing the contents of memory locations may include content associated with business data, where business data may include electronic files, applications and/or other data associated with an enterprise, business, and/or other organization. Erasing the contents of memory locations may also include content associated with personal data, where personal data may include electronic files, applications and/or other data that is not owned by and/or otherwise exclusively claimed and/or controlled by an enterprise, business and/or other organization. Restoring a User Device 100 to its factory state may include erasing the contents of all memory locations associated with data that was not present when the User Device 100 left the manufacturer and/or factory. Furthermore, remedial actions may be taken with respect to remote services communicatively coupled to a User Device 100, such as by blocking data transmissions from a User Device 100 to a remote service, blocking data transmissions from a remote service to a User Device 100, and erasing the contents of memory locations of a remote service. Once a remedial action is performed, method 300 may end at stage 335.

In some instances, the method 300 may repeat stage 330 to determine whether the functions that previously did not comply with the compliance rules now comply with the compliance rules. If it is determined that the functions, once again, do not comply with the compliance rules, the method 300 may perform at least one escalated remedial action. Certain remedial actions, such as erasing the contents of memory locations of a User Device 100 and restoring a User Device 100 to its factory state, may be more drastic than the other remedial actions disclosed and thereby classified as escalated remedial actions in such embodiment. Accordingly, if a function does not comply with the compliance rules for a second or subsequent time, an escalated remedial action may be performed. Once an escalated remedial action is performed, method 300 may end at stage 335.

If the function complies with the compliance rules at stage 320, method 300 may advance to stage 330 and approve the requests to perform functions on a User Device 100 and/or the functions being performed on a User Device 100. For instance, the requests to perform functions and/or the functions being performed may be approved by no action being taken by the method 300. Upon completion of stage 330, method 300 may end at stage 335.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   obtaining, from a compliance server, at least one compliance rule;
   storing, on a user device, the at least one compliance rule using an agent application;
   identifying, using the agent application, at least one request to execute an email application in the user device based on detecting an operating system call made by the email application on the user device;

determining, using the agent application, whether the at least one request does not comply with at least one compliance rule associated with the user device, wherein the at least one compliance rule specifies that the user device is authorized to access a business email account for the email application within a workday time period that begins at a workday start time and ends at a workday end time;

performing, using the agent application, at least one remedial action in response to at least one determination that the at least one request does not comply with at least one of the at least one compliance rule, wherein the at least one remedial action comprises disabling access to the business email account for the email application and allowing access to a personal email account for the email application; and in response to determining that the at least one request complies with the at least one compliance rule, enabling access to the business email account for the email application.

2. The method of claim 1, wherein the at least one request does not comply with the at least one compliance rule if the at least one request does not comply with the at least one compliance rule at the time of the at least one request.

3. The method of claim 1, wherein the at least one compliance rule comprises a plurality of compliance rules, and wherein performing the at least one remedial action in response to the at least one determination that the at least one request does not comply with at least one of the at least one compliance rule comprises at least one of:

determining that the at least one request does not comply with a threshold number of the plurality of compliance rules; or determining that the at least one request does not comply with each of the plurality of compliance rules.

4. The method of claim 1, wherein the at least one remedial action comprises at least one remedial action taken with respect to the user device.

5. The method of claim 1, wherein the at least one remedial action further comprises at least one of:

disabling at least one application of the user device;

restoring the user device to a factory state; or queuing the at least one request to execute the business email application on the user device until the at least one request complies with the at least one compliance rule associated with the user device.

6. The method of claim 1, wherein the at least one remedial action further comprises erasing data for at least one memory location of the user device, and wherein the data for the at least one memory location of the user device comprises:

content associated with the at least one request;
content associated with the at least one function;
content associated with business data; and
content associated with personal data.

7. The method of claim 1, wherein the at least one remedial action comprises at least one remedial action taken with respect to at least one remote service communicatively coupled to the user device.

8. The method of claim 7, wherein the at least one remedial action further comprises at least one of:

blocking at least one data transmission from the user device to the at least one remote service; or blocking at least one data transmission from the at least one remote service to the user device.

9. An apparatus comprising:

at least one processor; and at least one memory storage accessible to the at least one processor, the at least one memory storage comprising program instructions that, upon execution by the at least one processor, cause the at least one processor to at least:

obtain, from a compliance server, a plurality of compliance rules;

store the plurality of compliance rules using an agent application;

identify at least one request to execute an email application by a user device that is executing the agent application based on detecting an operating system call made by the email application on the user device;

determine whether the at least one request does not comply with the plurality of compliance rules, wherein a first compliance rule of the plurality of compliance rules specifies that the user device is authorized to access a business email account for the email application within a workday time period that begins at a workday start time and ends at a workday end time, wherein a second compliance rule of the plurality of compliance rules specifies that the user device is authorized to execute a personal email account for the email application within a personal time period that excludes the workday time period;

perform at least one remedial action in response to at least one determination that the at least one request does not comply with at least one of the plurality of compliance rules; and in response to determining that the at least one request complies with the plurality of compliance rules associated with the user device, enabling access to the business email account for the email application.

10. The apparatus of claim 9, wherein the user device is communicatively coupled to the apparatus.

11. The apparatus of claim 9, wherein the program instructions are further configured to cause the at least one processor to at least identify the at least one request being performed by the user device on a periodic basis.

12. The apparatus of claim 11, wherein the periodic basis comprises a setting configurable by at least one administrator.

13. The apparatus of claim 9, wherein the program instructions are further configured to cause the at least one processor to at least identify the at least one request being performed by the user device responsive to a request from at least one administrator of the apparatus.

14. The apparatus of claim 9, wherein the program instructions are further configured to cause the at least one processor to at least one of:

determine that the at least one request does not comply with a threshold number of the plurality of compliance rules; or determine that the at least one request does not comply with each of the plurality of compliance rules.

15. The apparatus of claim 9, wherein the at least one remedial action comprises at least one of:

disabling at least one application of the user device;
restoring the user device to its factory state; or
queuing the at least one request to perform the at least one function on the user device until the at least one request complies with the plurality of compliance rules associated with the user device.

16. The apparatus of claim 9, wherein the at least one remedial action comprises at least one of:

blocking at least one data transmission from the user device to at least one remote service communicatively coupled to the user device;

blocking at least one data transmission from the at least one remote service to the at least one user device; or erasing data for at least one memory location of the at least one remote service.

17. A non-transitory computer-readable medium that stores a set of instructions that are executable by a user device, wherein the set of instructions, when executed, causes the user device to perform a method comprising:

obtain, from a compliance server, at least one compliance rule;

storing, on the user device, the at least one compliance rule using an agent application;

identifying, using the agent application, at least one request to access a business email account for an email application by a user device that does not comply with at least one compliance rule associated with the user device, wherein the at least one compliance rule specifies that the at least one user device is authorized to access the business email account for the email application within a workday time period that beings at a workday start time and ends at a workday end time;

determining, using the agent application, whether the at least one request has been identified as being at least one noncompliant function prior to identifying that the at least one request does not comply with the at least one compliance rule; and performing, using the agent application, an escalated remedial action relative to a previously-initiated remedial action in response to at least one determination that the at least one request has been identified as being the at least one noncompliant function, wherein the escalated remedial action comprises erasing data for the business email account for the email application from a memory location on the user device.

18. The non-transitory computer-readable medium of claim 17, wherein the escalated remedial action comprises erasing a plurality of memory locations of a remote service.

19. The non-transitory computer-readable medium of claim 17, wherein the escalated remedial action comprises restoring the user device to a factory state.

20. The non-transitory computer-readable medium of claim 17, wherein the memory location comprises a first memory location, and further comprising:

erasing, using the agent application, personal data from a second memory location on the user device.

* * * * *